US009591557B2

(12) United States Patent
Miao et al.

(10) Patent No.: US 9,591,557 B2
(45) Date of Patent: Mar. 7, 2017

(54) REDUCING NETWORK SERVICE SCAN TIME BY A WIRELESS COMMUNICATION DEVICE

(71) Applicant: Apple Inc., Cupertino, CA (US)

(72) Inventors: Qiang Miao, Beijing (CN); Yaoqi Yan, Beijing (CN)

(73) Assignee: Apple Inc., Cupertino, CA (US)

( * ) Notice: Subject to any disclaimer, the term of this patent is extended or adjusted under 35 U.S.C. 154(b) by 136 days.

(21) Appl. No.: 14/390,756

(22) PCT Filed: Jun. 9, 2013

(86) PCT No.: PCT/CN2013/077039
§ 371 (c)(1),
(2) Date: Oct. 3, 2014

(87) PCT Pub. No.: WO2014/198014
PCT Pub. Date: Dec. 18, 2014

(65) Prior Publication Data
US 2016/0157161 A1 Jun. 2, 2016

(51) Int. Cl.
*H04W 4/00* (2009.01)
*H04W 48/16* (2009.01)
(Continued)

(52) U.S. Cl.
CPC ............. *H04W 48/16* (2013.01); *H04W 8/22* (2013.01); *H04W 84/00* (2013.01); *H04W 88/06* (2013.01)

(58) Field of Classification Search
CPC ....... H04W 4/02; H04W 36/08; H04W 36/12; H04W 36/14; H04W 36/18; H04W 36/30;
(Continued)

(56) References Cited

U.S. PATENT DOCUMENTS 8,855,636 B2 10/2014 Balasubramanian et al.
2005/0070279 A1 3/2005 Ginzburg et al.
(Continued)

FOREIGN PATENT DOCUMENTS

CN 102740413 10/2012
EP 1830596 A1 9/2007
(Continued)

OTHER PUBLICATIONS

International Search Report and Written Opinion for PCT/CN2013/077039 dated Mar. 13, 2014, 9 pp.
(Continued)

*Primary Examiner* — Temica M Beamer
(74) *Attorney, Agent, or Firm* — Downey Brand LLP

(57) ABSTRACT

A method for reducing network service scan time by a wireless communication device is provided. The method can include the wireless communication device determining a location of the wireless communication device. The method can further include the wireless communication devices selecting a subset of RATs supported by the wireless communication device based at least in part on the location of the wireless communication device and on deployment mapping information. The selected subset can include only one or more RATs indicated by the deployment mapping information to be deployed in the location of the wireless communication device. The method can further include the wireless communication device performing a service scan for at least one RAT included in the selected subset. Any RAT of the RATs supported by the wireless communication device that is not included in the selected subset can be excluded from the service scan.

27 Claims, 6 Drawing Sheets

(51) Int. Cl.
  *H04W 8/22* (2009.01)
  *H04W 84/00* (2009.01)
  *H04W 88/06* (2009.01)

(58) Field of Classification Search
  CPC ..... H04W 48/12; H04W 48/16; H04W 48/18; H04W 48/20; H04W 60/00; H04W 64/00; H04W 88/06
  USPC .......... 455/434, 435.2, 435.3, 456.1
  See application file for complete search history.

(56) References Cited

U.S. PATENT DOCUMENTS

| | | | |
|---|---|---|---|
| 2007/0025296 A1* | 2/2007 | Jung | H04W 36/32 370/331 |
| 2008/0261617 A1 | 10/2008 | Lin | |
| 2010/0069070 A1 | 3/2010 | Shi et al. | |
| 2010/0296441 A1* | 11/2010 | Barkan | H04W 12/08 370/328 |
| 2014/0274039 A1* | 9/2014 | Shah | H04W 48/16 455/434 |

FOREIGN PATENT DOCUMENTS

| | | |
|---|---|---|
| JP | 2012506679 A | 3/2012 |
| JP | 2013502855 A | 1/2013 |
| WO | 2006100653 | 9/2006 |
| WO | 2011022697 A1 | 2/2011 |
| WO | 2012135994 A1 | 10/2012 |

OTHER PUBLICATIONS

Japanese Patent Application No. 2016-517119—Office Action dated Oct. 17, 2016.
Korean Patent Application No. 10-2015-7034745—Office Action dated Oct. 25, 2016.
European Patent Application No. 13886878.1—Search Report dated Nov. 8, 2016.

* cited by examiner

REDUCING NETWORK SERVICE SCAN TIME BY A WIRELESS COMMUNICATION DEVICE

FIELD OF THE DESCRIBED EMBODIMENTS

The described embodiments relate generally to wireless communications technology, and more particularly to reducing network service scan time by a wireless communication device.

BACKGROUND

New radio access technologies (RATs), such as Long Term Evolution (LTE), offering faster data rates to support the capabilities of modern wireless communication devices continue to be developed and deployed at a rapid pace. These newer RATs are often co-deployed in areas of overlapping coverage with older legacy RATs. For example, Long Term Evolution (LTE) networks are being developed and deployed in regions of overlapping coverage with second generation (2G) networks, such as Global System for Mobile Communications (GSM) networks, and/or third generation (3G) networks, such as Universal Mobile Telecommunications System (UMTS) networks. However, the coverage area of co-deployed RATs is often not co-extensive. Moreover, some RATs can be deployed in certain regions, but not in other regions.

Given the multitude of RATs in deployment and the general lack of universal deployment of various RATs, modern wireless communication devices are often configured for operation as multi-mode devices supporting operation on multiple RATs so as to allow continued network connectivity of the device in mobility scenarios in which the device can move between areas of coverage of various RATs. Further, as each RAT can generally use multiple bands, a multi-mode device can be configured for operation on each band that can be used by a supported RAT.

When a multi-mode wireless communication device is first powered on and/or is attempting to recover from an out of service (OOS) condition, the device is presently configured to scan every band used by each RAT supported by the device to attempt to detect an available wireless signal regardless of whether a RAT/band is deployed in a region in which the device is operating. Accordingly, the device can waste time and battery power performing a service scan for a band(s) and/or RAT(s) which are not even deployed in the device's region of operation.

SUMMARY OF THE DESCRIBED EMBODIMENTS

Some example embodiments disclosed herein provide for reducing network service scan time by a wireless communication device. More particularly, some example embodiments provide for limiting a number of RATs and/or bands for which a service scan is performed based on a location of the wireless communication device. In this regard, the wireless communication device of such example embodiments can be provisioned with deployment mapping information indicative of RAT and/or band deployment in respective locations. Accordingly, the wireless communication device of such example embodiments can determine based on its location and the deployment mapping information a subset of RATs and/or bands supported by the wireless communication device that are deployed in the location of the wireless communication device and can limit performance of a service scan to those RATs/bands. As such, service scan time can be reduced in accordance with such example embodiments by limiting the service scan to RATs and/or bands deployed in the location of the wireless communication device rather than performing a service scan on every RAT and band supported by the wireless communication device. Further, such example embodiments can reduce battery consumption by a wireless communication device as a result of the reduced scan time.

In a first embodiment, a method for reducing network service scan time by a wireless communication device is provided. The method of the first embodiment can include the wireless communication device determining a location of the wireless communication device. The method of the first embodiment can further include the wireless communication device selecting a subset of a plurality of RATs supported by the wireless communication device based at least in part on the location of the wireless communication device and on deployment mapping information. The selected subset can be comprised only of one or more RATs indicated by the deployment mapping information to be deployed in the location of the wireless communication device. The method of the first embodiment can additionally include the wireless communication device performing a service scan for at least one RAT included in the selected subset. Any RAT of the plurality of RATs supported by the wireless communication device that is not included in the selected subset can be excluded from the service scan.

In a second embodiment, a wireless communication device is provided. The wireless communication device of the second embodiment can at least one transceiver and processing circuitry coupled to the at least one transceiver. The at least one transceiver can be configured to transmit and receive data in accordance with a plurality of RATs supported by the wireless communication device. The processing circuitry of the second embodiment can be configured to control the wireless communication device to determine a location of the wireless communication device. The processing circuitry of the second embodiment can be further configured to control the wireless communication device to select a subset of the plurality of RATs supported by the wireless communication device based at least in part on the location of the wireless communication device and on deployment mapping information. The selected subset can be comprised only of one or more RATs indicated by the deployment mapping information to be deployed in the location of the wireless communication device. The processing circuitry of the second embodiment can additionally be configured to control the wireless communication device to perform a service scan for at least one RAT included in the selected subset. Any RAT of the plurality of RATs supported by the wireless communication device that is not included in the selected subset can be excluded from the service scan.

In a third embodiment, a computer program product for reducing network service scan time by a wireless communication device is provided. The computer program product of the third embodiment can include at least one non-transitory computer readable storage medium having program code stored thereon. The program code of the third embodiment can include program code for determining a location of the wireless communication device. The program code of the third embodiment can further include program code for selecting a subset of a plurality of RATs supported by the wireless communication device based at least in part on the location of the wireless communication device and on deployment mapping information. The selected subset can be comprised only of one or more RATs indicated by the deployment mapping information to be deployed in the location of the wireless communication device. The program code of the third embodiment can additionally include program code for performing a service scan for at least one RAT included in the selected subset. Any RAT of the plurality of RATs supported by the wireless communication device that is not included in the selected subset can be excluded from the service scan.

In a fourth embodiment, an apparatus for reducing network service scan time by a wireless communication device is provided. The apparatus of the fourth embodiment can include means for determining a location of the wireless communication device. The apparatus of the fourth embodiment can further include means for selecting a subset of a plurality of RATs supported by the wireless communication device based at least in part on the location of the wireless communication device and on deployment mapping information. The selected subset can be comprised only of one or more RATs indicated by the deployment mapping information to be deployed in the location of the wireless communication device. The apparatus of the fourth embodiment can additionally include means for performing a service scan for at least one RAT included in the selected subset. Any RAT of the plurality of RATs supported by the wireless communication device that is not included in the selected subset can be excluded from the service scan.

This Summary is provided merely for purposes of summarizing some example embodiments so as to provide a basic understanding of some aspects of the disclosure. Accordingly, it will be appreciated that the above described example embodiments are merely examples and should not be construed to narrow the scope or spirit of the disclosure in any way. Other embodiments, aspects, and advantages will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings are not necessarily drawn to scale, and in no way limit any changes in form and detail that may be made to the described embodiments by one skilled in the art without departing from the spirit and scope of the described embodiments.

DETAILED DESCRIPTION OF SELECTED EMBODIMENTS

Figure 1:
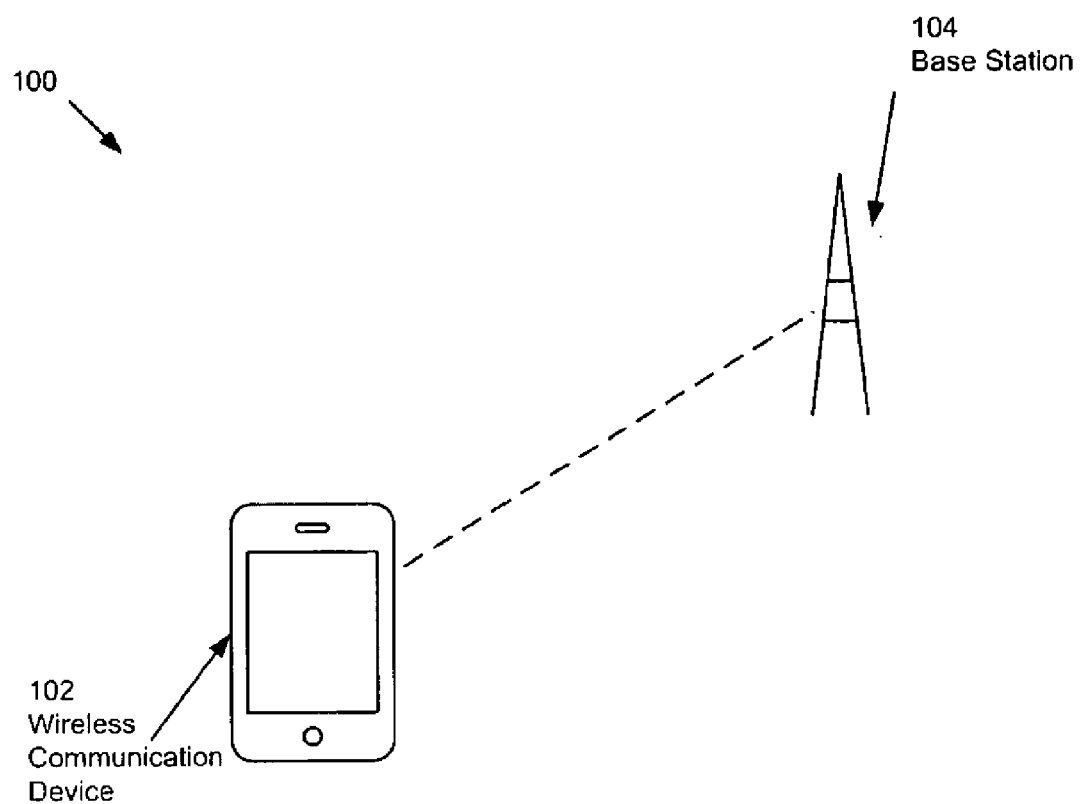
FIG. 1 illustrates a wireless communication system in accordance with some example embodiments.

When an existing multi-mode wireless communication device is first powered on or is attempting to recover from an out of service (OOS) condition, the device is configured to scan every band used by each RAT supported by the device to attempt to detect an available wireless signal. However, deployment of RATs and bands is not universal. Thus, existing wireless communication devices perform a service scan for supported RATs and bands regardless of whether a RAT/band is deployed in a region in which the device is operating. For example, TD-SCDMA is deployed only in China, but current wireless communication devices supporting operation on Time Division Synchronous Code Division Multiple Access (TD-SCDMA) networks scan for TD-SCDMA coverage even if operating in the United States. As another example, GSM is not deployed in Japan. However, current wireless communication devices supporting GSM operation scan for GSM coverage even if operating in Japan. As yet another example, a given RAT can be defined to use any band within a specific set of bands in accordance with specifications for the RAT. However, a deployment of the RAT in a given location, such as a given country, may not use one or more bands that can be used by the RAT, such as if a network operator is not licensed to use the band, the band is not permitted to be used in the location, and/or other reason. Nevertheless, current wireless communication devices scan every band that can be used by a RAT even if a band(s) is not deployed in the device location. As such, considerable time can be wasted by current wireless communication devices scanning for RATs and/or bands that are not deployed in an area in which a device is operating. This excess scan time can also result in excess battery consumption by a wireless communication device.

Some example embodiments disclosed herein reduce network service scan time by a wireless communication device, thus addressing the problems of excessive unnecessary service scanning in existing wireless communication devices. More particularly, some example embodiments provide for limiting a number of RATs and/or bands for which a service scan is performed based on a location of the wireless communication device. In this regard, the wireless communication device of such example embodiments can be provisioned with deployment mapping information indicative of RAT deployment and/or band deployment in respective locations. Accordingly, the wireless communication device of such example embodiments can use the deployment mapping information to determine a subset of RATs and/or bands supported by the wireless communication device that are deployed in the location of the wireless communication device and can exclude RATs and/or bands that are not deployed in the device's location of operation from the service scan. As such, service scan time can be reduced in accordance with such example embodiments by limiting the service scan to RATs and/or bands deployed in the location of the wireless communication device rather than performing a service scan on every RAT and/or every band supported by the wireless communication device. Furthermore, such example embodiments can reduce power (e.g., battery) consumption by a wireless communication device as a result of the reduced scan time.

FIG. 1 illustrates a communication system 100 in accordance with some example embodiments. The system 100 can include a wireless communication device 102, which can be a multi-mode device configured to support operation over a plurality of RATs. By way of non-limiting example, the wireless communication device 102 can be embodied as a mobile terminal, cellular phone, smart phone, tablet computing device, laptop computer, desktop computer, and/or other computing device that can be configured to support communication over a wireless network.

The system 100 can include one or more wireless networks, such as one or more cellular networks, also known as pubic land mobile networks (PLMNs). For example, the system 100 can include a network(s) using one or more fourth generation (4G) cellular RATs, such as LTE, LTE-Advanced (LTE-A), and/or other 4G cellular RAT; one or more third generation (3G) cellular RATs, such as Wideband Code Division Multiple Access (WCDMA), TD-SCDMA, Universal Mobile Telecommunications System (UMTS), CDMA 2000, and/or other 3G cellular RAT; one or more second generation (2G) cellular RATs, such as GSM and/or other 2G cellular RAT; and/or other present or future developed cellular RAT. It will be appreciated, however, that embodiments disclosed herein are not limited to application in the context of network service scanning for cellular networks. As such, it will be appreciated that some example embodiments can be applied to network service scanning for wireless networks using non-cellular RATs, such as wireless local area networks (WLAN) RATs, WiMAX networks, and/or other non-cellular RATs, in addition to or in lieu of cellular RATs.

The wireless communication device 102 can accordingly be located in a region in which one or more wireless networks, each using a respective RAT, are deployed. A network deployed in the system 100 can be accessed by the wireless communication device 102 through a wireless network access point, such as a base station 104 and/or other wireless network access point. In this regard, the wireless communication device 102 can be within range of one or more base stations 104 and/or one or more other wireless network access points. The wireless communication device 102 can accordingly be configured to discover a network(s) within range of the device, such as when powering up and/or attempting to recover from an OOS condition, by performing a service scan to detect signals from one or more base stations 104 and/or other wireless network access point(s) within signaling range of the wireless communication device 102.

Figure 2:
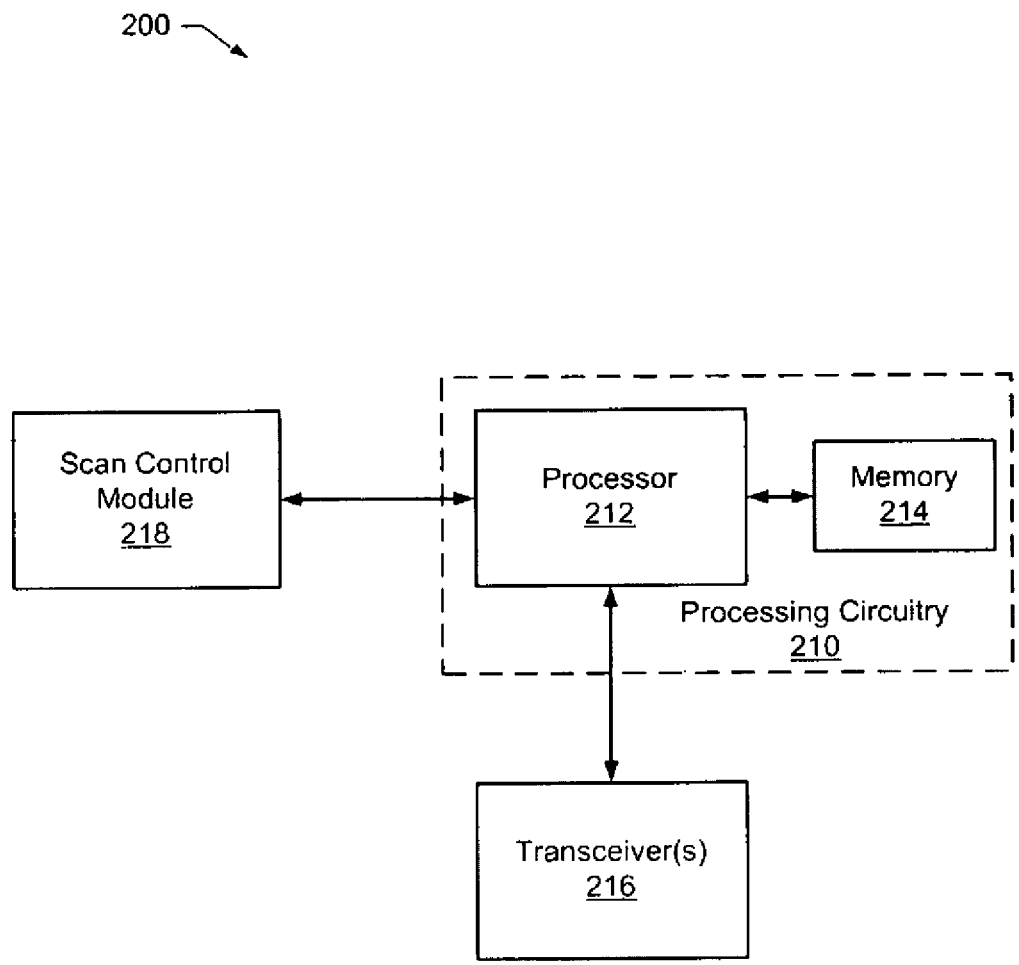
FIG. 2 illustrates a block diagram of an apparatus that can be implemented on a wireless communication device in accordance with some example embodiments.

FIG. 2 illustrates a block diagram of an apparatus 200 that can be implemented on the wireless communication device 102, in accordance with some example embodiments. In this regard, when implemented on a computing device, such as wireless communication device 102, apparatus 200 can enable the computing device to operate within the system 100 and perform a network service scan in accordance with one or more example embodiments. It will be appreciated that the components, devices or elements illustrated in and described with respect to FIG. 2 below may not be mandatory and thus some may be omitted in certain embodiments. Additionally, some embodiments can include further or different components, devices or elements beyond those illustrated in and described with respect to FIG. 2.

In some example embodiments, the apparatus 200 can include processing circuitry 210 that is configurable to perform actions in accordance with one or more example embodiments disclosed herein. In this regard, the processing circuitry 210 can be configured to perform and/or control performance of one or more functionalities of the apparatus 200 in accordance with various example embodiments, and thus can provide means for performing functionalities of the apparatus 200 in accordance with various example embodiments. The processing circuitry 210 can be configured to perform data processing, application execution and/or other processing and management services according to one or more example embodiments.

In some embodiments, the apparatus 200 or a portion(s) or component(s) thereof, such as the processing circuitry 210, can include one or more chipsets, which can each include one or more chips. The processing circuitry 210 and/or one or more further components of the apparatus 200 can therefore, in some instances, be configured to implement an embodiment on a chipset. In some example embodiments in which one or more components of the apparatus 200 are embodied as a chipset, the chipset can be capable of enabling a computing device to operate in the system 100 when implemented on or otherwise operably coupled to the computing device. Thus, for example, one or more components of the apparatus 200 can provide a cellular baseband chipset configured to enable a computing device to operate over one or more cellular RATs.

In some example embodiments, the processing circuitry 210 can include a processor 212 and, in some embodiments, such as that illustrated in FIG. 2, can further include memory 214. The processing circuitry 210 can be in communication with or otherwise control a transceiver(s) 216 and/or scan control module 218.

The processor 212 can be embodied in a variety of forms. For example, the processor 212 can be embodied as various hardware-based processing means such as a microprocessor, a coprocessor, a controller or various other computing or processing devices including integrated circuits such as, for example, an ASIC (application specific integrated circuit), an FPGA (field programmable gate array), some combination thereof, or the like. Although illustrated as a single processor, it will be appreciated that the processor 212 can comprise a plurality of processors. The plurality of processors can be in operative communication with each other and can be collectively configured to perform one or more functionalities of the apparatus 200 and/or of the wireless communication device 102 as described herein. In some example embodiments, the processor 212 can be configured to execute instructions that can be stored in the memory 214 or that can be otherwise accessible to the processor 212. For example, in some example embodiments, the processor 212 can be embodied as a general purpose computing processor that can be coupled to the memory 214, such as via a bus, and can be configured to perform operations in accordance with one or more example embodiments through execution of instructions that can be stored in the memory 214. As such, whether configured by hardware or by a combination of hardware and software, the processor 212 can be capable of performing operations according to various embodiments while configured accordingly.

In some example embodiments, the memory 214 can include one or more memory devices. Memory 214 can include fixed and/or removable memory devices. In some embodiments, the memory 214 can provide a non-transitory computer-readable storage medium that can store computer program instructions that can be executed by the processor 212. In this regard, the memory 214 can be configured to store information, data, applications, instructions and/or the like for enabling the apparatus 200 to carry out various functions in accordance with one or more example embodiments. In some embodiments, the memory 214 can be in communication with one or more of the processor 212, transceiver(s) 216, or scan control module 218 via a bus (or buses) for passing information among components of the apparatus 200.

The apparatus 200 can further include one or more transceivers, illustrated as transceiver(s) 216. The transceiver(s) 216 can enable the apparatus 200 to send and receive wireless signals in accordance with a plurality of RATs. As such, the transceiver(s) 316 can be configured to support communication of data via any RAT that can be supported by the wireless communication device 102. The transceiver(s) 216 can accordingly be configured to enable the wireless communication device 102 to detect and communicate with a base station 104.

The apparatus 200 can further include scan control module 218. The scan control module 218 can be embodied as various means, such as circuitry, hardware, a computer program product comprising computer readable program instructions stored on a computer readable medium (for example, the memory 214) and executed by a processing device (for example, the processor 212), or some combination thereof. In some embodiments, the processor 212 (or the processing circuitry 210) can include, or otherwise control the scan control module 218.

The wireless communication device 102 can be provisioned with deployment mapping information indicative of RAT deployment and/or band deployment in respective locations. In this regard, the deployment mapping information can define a mapping for a respective location and for a set of one or more RATs and/or bands deployed in the location. The scan control module 218 can accordingly be configured to use the deployment mapping information to determine the RAT(s) and/or band(s) that are deployed in a location in which the wireless communication device 102 is operating.

The deployment mapping information can use any of a variety of levels of location granularity for mapping deployment information in accordance with various example embodiments. For example, in some example embodiments, the deployment mapping information can include country-level deployment information indicative of a set of RAT(s) and/or band(s) deployed in each respective country of a plurality of countries. It will be appreciated, however, that other levels of granularity are contemplated within the scope of the disclosure. For example, the deployment mapping information can additionally or alternatively include RAT/band deployment information for respective continents, states, provinces, regions, cities, municipalities, zip codes, coordinate positions (e.g., as can be determined through use of GPS and/or other satellite positioning system), and/or one or more other geographic and/or political location units.

The deployment mapping information can be provisioned to the wireless communication device 102 by through any of a variety of sources. For example, the deployment mapping information can be provisioned to the wireless communication device 102 at the time of manufacture by a device manufacturer. As another example, location mapping information can be provisioned to the wireless communication device 102 as a component of an operating system that can be implemented on the device. As still a further example, the location mapping information can be provisioned to the wireless communication device 102 by a network operator. In some example embodiments, the deployment mapping information can be updated, such as, periodically and/or in an instance in which deployment mapping information that can be maintained by an entity, such as a device manufacturer, network operator, operating system developer, and/or the like, is updated to reflect updated deployment information. In this regard, the wireless communication device 102 can be provisioned with and/or can otherwise download updated deployment mapping information, such as via over-the-air (OTA) techniques.

The scan control module 218 can be configured to use the deployment mapping information to determine a subset of the RATs supported by the wireless communication device 102 that are deployed in the location of the wireless communication device 102. For example, the scan control module 218 of some example embodiments can be configured to control a protocol stack to set the RAT capability dynamically based on the device's location prior to performing a service scan.

Accordingly, when performing a service scan, such as when the wireless communication device 102 is attempting to recover from an OOS condition and/or when the wireless communication device 102 is powered on and attempting to acquire network service, the scan control module 218 can be configured to limit the service scan to scanning for a RAT(s) known to be deployed in the device's location, while excluding scanning for a RAT(s) that is not deployed in the device's location. Thus, for example, if the wireless communication device 102 is configured for operation in China and supports TD-SCDMA, but is roaming in the United States, the deployment mapping information can be used to determine to exclude TD-SCDMA from the service scan.

Figure 3:
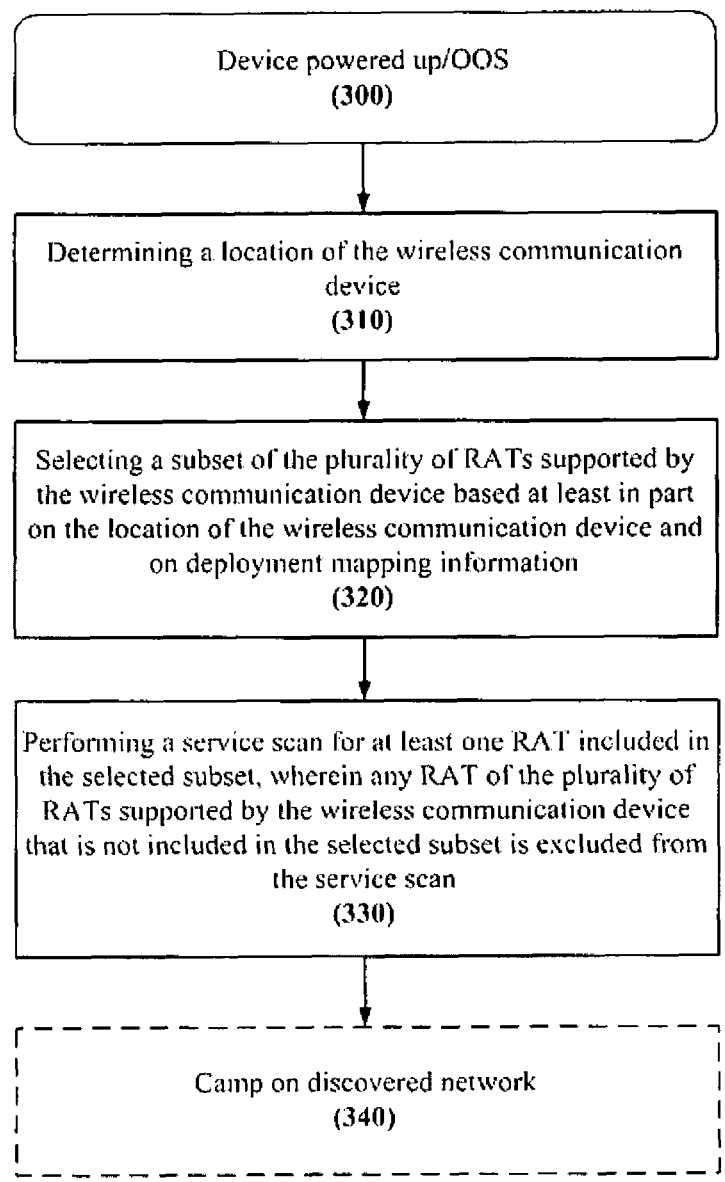
FIG. 3 illustrates a flowchart according to an example method for reducing network service scan time by a wireless communication device by limiting a number of RATs that are scanned in accordance with some example embodiments.

FIG. 3 illustrates a flowchart according to an example method for reducing network service scan time by a wireless communication device 102 by limiting a number of RATs that are scanned in accordance with some example embodiments. In this regard, FIG. 3 illustrates operations that can be performed by a wireless communication device 102 in accordance with some example embodiments. One or more of processing circuitry 210, processor 212, memory 214, transceiver(s) 216, or scan control module 218 can, for example, provide means for performing the operations illustrated in and described with respect to FIG. 3.

At operation 300, the wireless communication device 102 can be powered up or can be experiencing an OOS condition. Operation 310 can include the wireless communication device 102 determining a location of the wireless communication device 102.

The wireless communication device 102 can use any of a variety of techniques to determine its location in operation 310. For example, in embodiments in which the wireless communication device 102 has a satellite positioning sensor, such as a Global Positioning Service (GPS) sensor, the wireless communication device 102 can use position data obtained from GPS and/or other satellite positioning services to determine its location. As another example, the wireless communication device 102 can use location information that can be broadcast or otherwise received from wireless network access point, such as a WLAN access point to determine its location in operation 310.

As yet another example, the wireless communication device 102 of some example embodiments can use a mobile country code (MCC), cell ID, and/or other location identifier that may have been obtained from a last network(s) to which the wireless communication device 102 was connected before being powered down and/or before experiencing an OOS condition to determine its location in operation 310. In some such example embodiments, the location of the last network to which the wireless communication device 102 was connected can be considered to be valid if the time elapsed since the connection to the last network was lost/terminated is less than a threshold. If, however, the time elapsed since the connection to the last network was lost/terminated is not less than the threshold, the location of the last network may not be considered to be valid as the device's present location for performance of operation 310.

In some example embodiments, if the device location is not available to the wireless communication device, such as through application of one of the foregoing techniques, the wireless communication device 102 can be configured to perform a scan in accordance with the method illustrated in and described below with respect to FIG. 6 to determine its location.

Operation 320 can include the wireless communication device 102 selecting a subset of the plurality of RATs supported by the wireless communication device 102 based at least in part on the location determined in operation 310 and on deployment mapping information pre-provisioned to the wireless communication device 102. For example, in some embodiments in which the deployment mapping information defines a mapping between each country of a plurality of countries and a respective set of one or more RATs deployed in the country, operation 320 can include the wireless communication device 102 selecting a subset comprising one or more RATs indicated by the deployment mapping information to be deployed within the country in which the wireless communication device 102 is operating. A RAT(s) supported by the wireless communication device 102 that is not indicated by the deployment mapping information to be deployed in the location in which the wireless communication device 102 is operating can be excluded from the subset determined in operation 320

Operation 330 can include the wireless communication device 102 performing a service scan for at least one RAT included in the selected subset. Any RAT of the plurality of RATs supported by the wireless communication device 102 that is not included in the selected subset is excluded from the service scan.

The method can optionally further include operation 340, which can include the wireless communication device 102 camping on a network discovered in operation 330.

In some example embodiments in which deployment mapping information indicates whether bands that can be used by one or more respective RATs are deployed in a location, the scan control module 218 can be configured to use the deployment mapping information to select a deployed band set for one or more RATs deployed in the location of operation of the wireless communication device 102. In this regard, a deployed band set selected for a RAT can be comprised of at least one band used by the RAT that is indicated by the deployment mapping information to be deployed in the location of the wireless communication device 102 and can exclude any band used by the RAT that is not indicated by the deployment mapping information to be deployed in the location of the wireless communication device 102. Accordingly, when performing a service scan for a RAT for which a deployed band set has been selected, the scan control module 218 of some example embodiments can be configured to limit the service scan to only the band(s) known to be deployed in the location of the wireless communication device 102.

Figure 4:
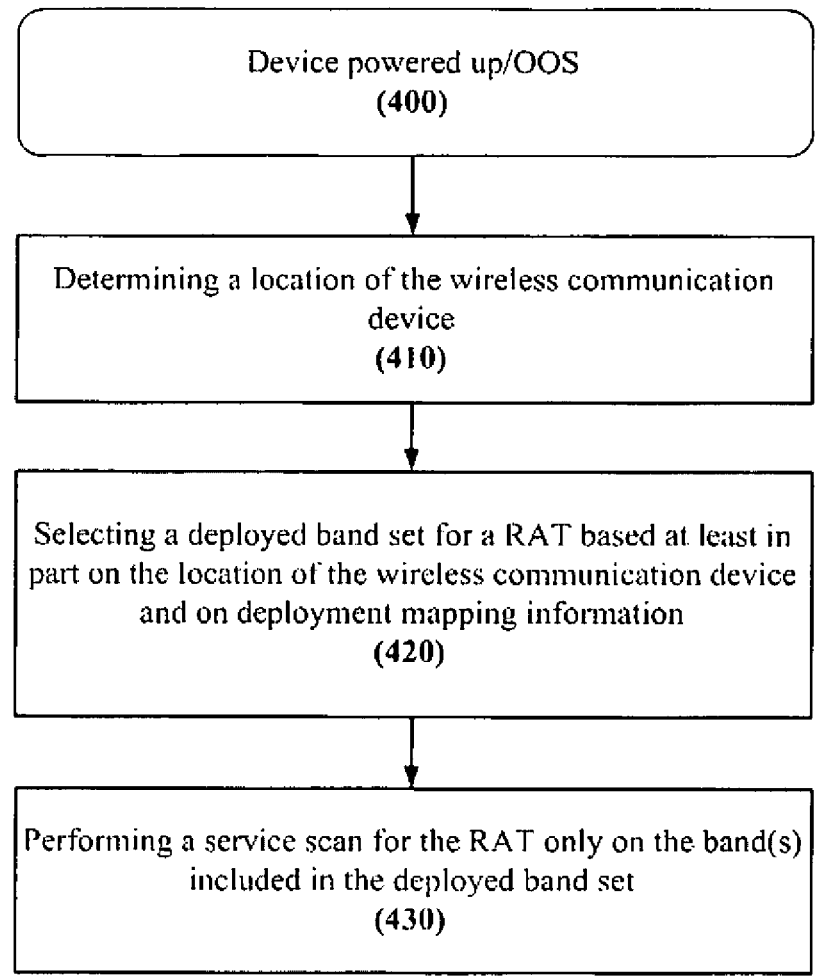
FIG. 4 illustrates a flowchart according to an example method for reducing network service scan time by a wireless communication device by limiting a number of bands that are scanned in accordance with some example embodiments.

FIG. 4 illustrates a flowchart according to an example method for reducing network service scan time by a wireless communication device 102 by limiting a number of bands that are scanned in accordance with some example embodiments. In this regard, FIG. 4 illustrates operations that can be performed by a wireless communication device 102 in accordance with some example embodiments. One or more of processing circuitry 210, processor 212, memory 214, transceiver(s) 216, or scan control module 218 can, for example, provide means for performing the operations illustrated in and described with respect to FIG. 4.

At operation 400, the wireless communication device 102 can be powered up, or can be experiencing an OOS condition. Operation 410 can include the wireless communication device 102 determining a location of the wireless communication device 102. Operation 410 can, for example, be performed using one or more of the techniques described with respect to operation 310.

Operation 420 can include the wireless communication device 102 selecting a deployed band set for a RAT based at least in part on the location of the wireless communication device 102 and on deployment mapping information. The deployed band set can include at least one band used by the RAT that is indicated by the deployment mapping information to be deployed in the location of the wireless communication device 102 and can exclude any band used by the RAT that is not indicated by the deployment mapping information to be deployed in the location of the wireless communication device 102.

In some example embodiments, the techniques for limiting a number of bands that are scanned as described with respect to FIG. 4 can be combined with the techniques for limiting the number of RATs that are scanned as described with respect to FIG. 3. In some such example embodiments, operation 420 can be performed for each of one or more RATs in the subset that can be determined in operation 320.

Operation 430 can include the wireless communication device 102 performing a service scan for the RAT only on the band(s) included in the deployed band set determined in operation 420. Accordingly, if a RAT deployment in a given location does not include a deployment of every band that can be used by the RAT in accordance with the RAT specification, scanning for a band(s) that is not deployed can be avoided.

In some example embodiments, operation 430 can be performed one or more times attendant to performance of operation 330. In this regard, operation 430 can be used to perform a service scan for a RAT in the subset of RATs (selected from the plurality of RATs) that can be determined in operation 320 for which a band deployment set has been selected.

Figure 5:
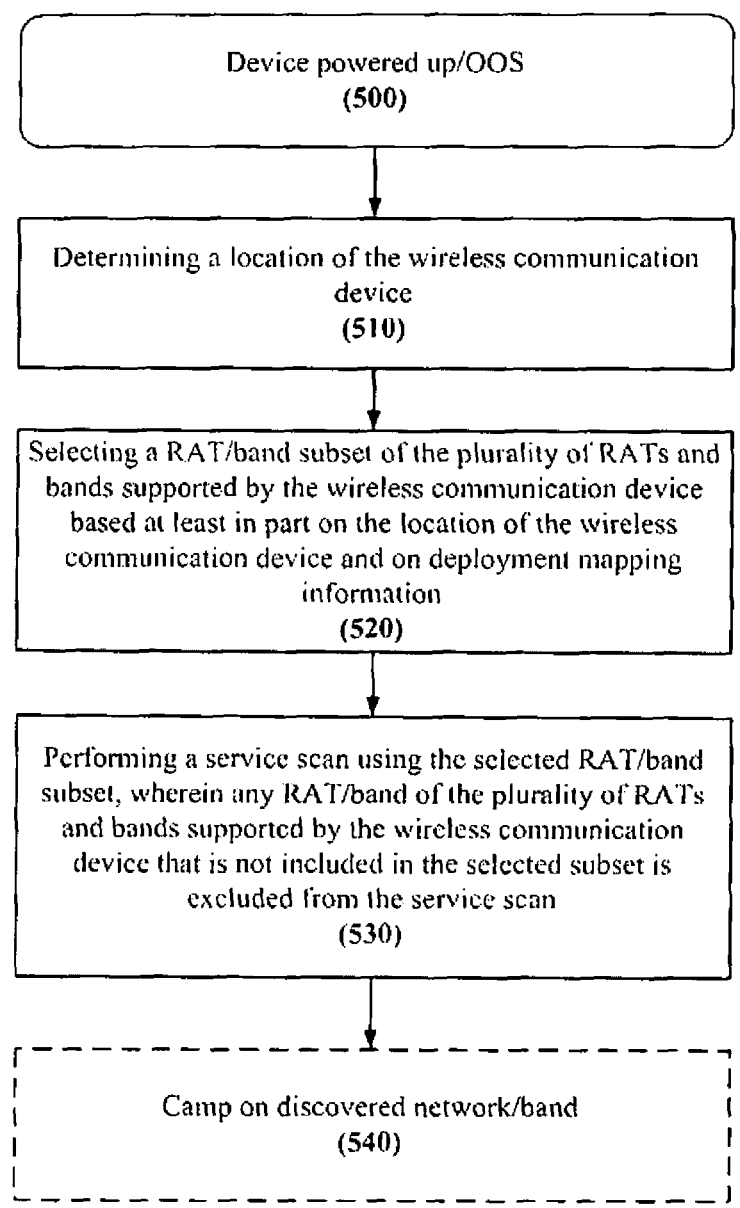
FIG. 5 illustrates a flowchart according to an example method for reducing network service scan time by a wireless communication device in accordance with some example embodiments.

FIG. 5 illustrates a flowchart according to an example method for reducing network service scan time by a wireless communication device 102 in accordance with some example embodiments. In this regard, FIG. 5 illustrates operations that can be performed by a wireless communication device 102 that can be configured to dynamically limit both the RATs and the bands of one or more RATs for which a service scan is performed based on a location of the wireless communication device 102 in accordance with some example embodiments. One or more of processing circuitry 210, processor 212, memory 214, transceiver(s) 216, or scan control module 218 can, for example, provide means for performing the operations illustrated in and described with respect to FIG. 5.

At operation 500, the wireless communication device 102 can be powered up, or can be experiencing an OOS condition. Operation 510 can include the wireless communication device 102 determining a location of the wireless communication device 102. Operation 510 can, for example, be performed using one or more of the techniques described with respect to operation 310.

Operation 520 can include the wireless communication device 102 selecting a RAT/band subset of the plurality of RATs and bands supported by the wireless communication device 102 based at least in part on the location of the wireless communication device 102 and on deployment mapping information. In this regard, operation 520 can, for example, include selecting a subset of the RATs supported by the wireless communication device 102 in accordance with operation 320. Operation 520 can further include determining a deployed band set, as described with respect to operation 420, for each of one or more RATs determined to be deployed in the location of the wireless communication device 102. Accordingly any RAT supported by the wireless communication device 102 that is not deployed in the location can be excluded from the RAT/band subset. Further, if less than every band used by a deployed RAT is deployed in the location, the band(s) that is not deployed in the location can be excluded from the RAT/band subset.

Operation 530 can include the wireless communication device 102 performing a service scan using the selected RAT/band subset. Any RAT/band of the plurality of RATs and bands supported by the wireless communication device 102 that is not included in the selected subset can be excluded from the service scan. The method can optionally further include operation 540, which can include the wireless communication device 102 camping on a discovered RAT/band.

In instances in which the location of the wireless communication device 102 is not available to the wireless communication device 102, such as through one or more of the techniques described with respect to operation 310, the wireless communication device 102 can be configured to perform a location scan by scanning for a network prior to performing a service scan. In this regard, the device location can be obtained from information that can be broadcast or otherwise signaled by a cellular and/or other wireless network. For example, a cellular network (e.g., a PLMN) can signal a mobile country code (MCC) indicating the country in which the network is deployed, which can be used by the wireless communication device 102 of some example embodiments to determine its location of operation.

In embodiments using a location scan to obtain a location of the wireless communication device 102 in instances in which the location is not otherwise available to the wireless communication device 102, the scan control module 218 can be configured to perform a full band scan (e.g., all bands used by a RAT) for at least one of the plurality of RATs supported by the wireless communication device 102 in accordance with a predefined RAT priority ordering, beginning with a highest priority RAT. In some example embodiments, the predefined RAT priority ordering can prioritize the plurality of RATs supported by the wireless communication device 102 based on a number of bands used by each of the plurality of RATs from a highest priority RAT using the fewest bands to a lowest priority RAT using the most bands. In this regard, it can take less time to scan for a RAT using fewer bands than for a RAT using more bands. As such, ranking a RAT using fewer bands with a higher priority can help the wireless communication device 102 determine its location more quickly.

In some example embodiments, the predefined RAT priority ordering can prioritize one or more second generation (2G) RATs in a highest priority grouping, one or more third generation (3G) RATs in a second priority grouping, and one or more fourth generation (4G) RATs in a third priority grouping (e.g., 2G>3G>4G) for performance of a location scan. In this regard, as seen from Table 1 below, LTE has more bands than UMTS, which has more bands than GSM. As such, performing a full band scan for LTE can take more time than GSM and UMTS. Accordingly, ranking GSM first can help the wireless communication device 102 to determine its location more quickly, provided that GSM is deployed in its location.

TABLE 1

| RAT | Commonly Used Band List |
| --- | --- |
| GSM | 4 bands: CS1800, EGSM900, GSM 850, PCS1900 |
| UMTS | 7 bands: Bands I, II, III, IV, V, VI, VIII |
| LTE | 14 bands: Bands 1, 2, 3, 4, 5, 7, 13, 17, 18, 20, 25, 38, 39, 40 |

After a wireless communication device 102 has determined its location through performance of a location scan, scan control module 318 can be configured to discontinue (e.g., break) the full band scan, and can proceed with one or more of operations 320, 420, or 520 to select a RAT(s) and/or a band(s) on which to perform a service scan prior to performing a service scan (e.g., in accordance with one or more of operations 330, 430, or 530).

Figure 6:
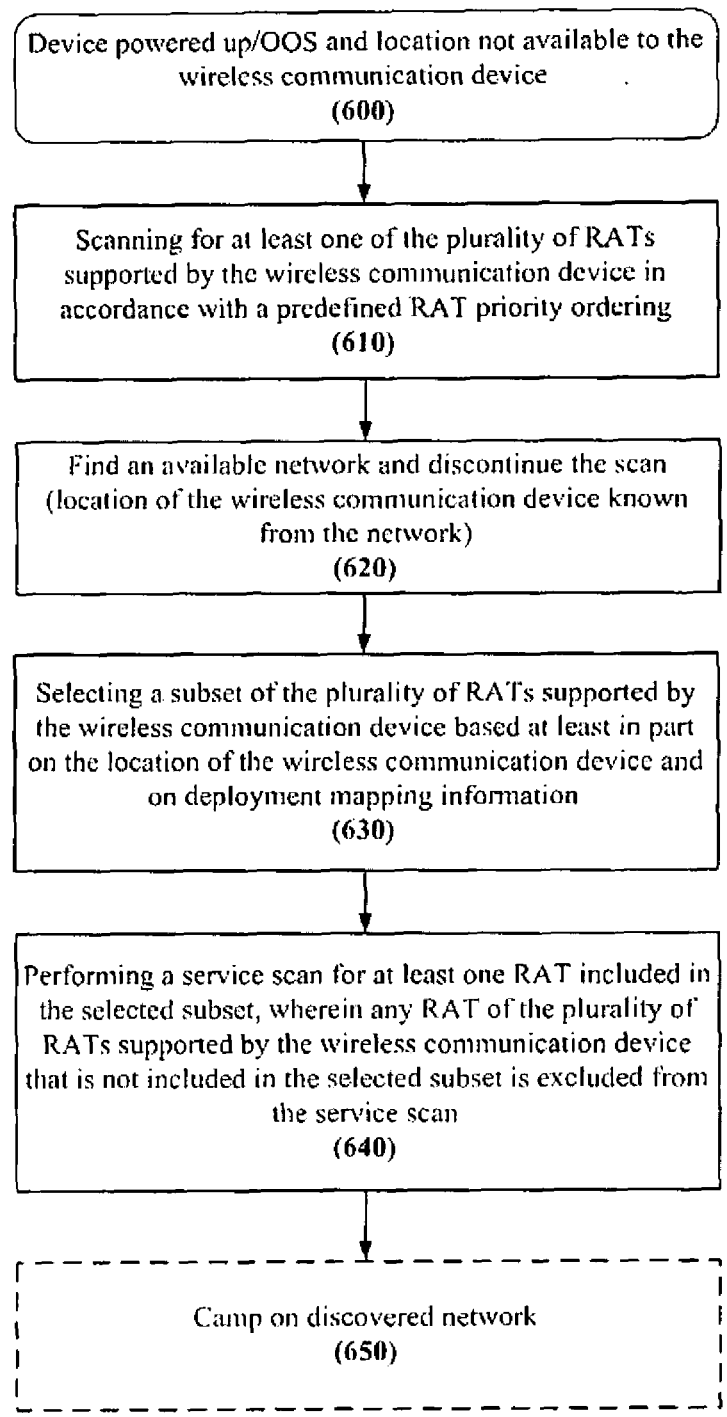
FIG. 6 illustrates a flowchart according to another example method for reducing network service scan time by a wireless communication device in accordance with some example embodiments.

FIG. 6 illustrates a flowchart according to another example method for reducing network service scan time by a wireless communication device 102 in accordance with some example embodiments. In this regard, FIG. 6 illustrates operations that can be performed by a wireless communication device 102 in accordance with some example embodiments. One or more of processing circuitry 210, processor 212, memory 214, transceiver(s) 216, or scan control module 218 can, for example, provide means for performing the operations illustrated in and described with respect to FIG. 6.

At operation 600, the wireless communication device 102 can be powered up or can be experiencing an OOS condition. However, the location of the wireless communication device 102 may not be known or otherwise available to the wireless communication device 102.

Operation 610 can include the wireless communication device 102 scanning for at least one of the plurality of RATs supported by the wireless communication device 102 in accordance with a predefined RAT priority ordering (e.g., 2G>3G>4G). Operation 610 can include performance of a scan through a complete set of bands for each respective RAT that is scanned until a network is found.

Operation 620 can include the wireless communication device 102 finding a network (e.g., a PLMN) and discontinuing the location scan of operation 610. Thus, once a network is found, the scan can be discontinued without continuing to scan for further RATs/bands. The location of the wireless communication device 102 can be known from the found network, such as from an MCC and/or from other information that can be broadcast and/or otherwise signaled by the found network.

Operation 630 can include the wireless communication device 102 selecting a subset of the plurality of RATs supported by the wireless communication device 102 based at least in part on the location of the wireless communication device 102 and on deployment mapping information. In this regard operation 630 can correspond to an embodiment of operation 320. If deployment mapping information is available for band deployment, operation 630 can further include determining a deployed band set for each of one or more RATs, such as described with respect to operation 420 and/or operation 520.

Operation 640 can include the wireless communication device 102 performing a service scan for at least one RAT included in the subset selected in operation 630. Any RAT of the plurality of RATs supported by the wireless communication device 102 that is not included in the selected subset can be excluded from the service scan. In this regard, operation 640 can correspond to an embodiment of operation 330. In embodiments in which a deployed band set(s) is determined, performance of the service scan for a RAT for which a deployed band set has been determined can be restricted to a band(s) in the deployed band set, while excluding any band(s) that is not deployed in the location of the wireless communication device 102, such as described with respect to operation 430.

The method can optionally further include operation 650, which can include the wireless communication device 102 camping on a network found through performance of the service scan.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line. The computer readable medium is any data storage device that can store data which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in a distributed fashion.

In the foregoing detailed description, reference was made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

Further, the foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. The description of and examples disclosed with respect to the embodiments presented in the foregoing description are provided solely to add context and aid in the understanding of the described embodiments. The description is not intended to be exhaustive or to limit the described embodiments to the precise forms disclosed. It will be apparent to one of ordinary skill in the art that many modifications, alternative applications, and variations are possible in view of the above teachings. In this regard, one of ordinary skill in the art will readily appreciate that the described embodiments may be practiced without some or all of these specific details. Further, in some instances, well known process steps have not been described in detail in order to avoid unnecessarily obscuring the described embodiments.

What is claimed is:

1. A method for reducing network service scan time by a wireless communication device, the method comprising the wireless communication device:
   determining a location of the wireless communication device;
   selecting a subset of a plurality of radio access technologies (RATs) supported by the wireless communication device, and for each selected RAT at least one deployed band, based at least in part on the location of the wireless communication device and on deployment mapping information, the selected subset comprised only of one or more RATs indicated by the deployment mapping information as deployed in the location of the wireless communication device; and
   performing a service scan for at least one RAT included in the selected subset only on deployed bands, wherein any RAT of the plurality of RATs supported by the wireless communication device that is not included in the selected subset is excluded from the service scan.

2. The method of claim 1, further comprising the wireless communication device:
   selecting deployed bands for a respective RAT based at least in part on the deployment mapping information and excluding any band used by the RAT that is indicated by the deployment mapping information as not deployed in the location of the wireless communication device.

3. The method of claim 1, wherein the deployment mapping information is pre-provisioned to the wireless communication device.

4. The method of claim 1, wherein the deployment mapping information defines a mapping between each location of a plurality of locations and a respective set of one or more RATs deployed in the location.

5. The method of claim 1, wherein:
   determining the location of the wireless communication device comprises determining a country in which the wireless communication device is being operated, the deployment mapping information defining a mapping between each country of a plurality of countries and a respective set of one or more RATs deployed in the country; and
   selecting the subset comprises selecting a subset of the plurality of RATs supported by the wireless communication device comprised of one or more RATs indicated by the deployment mapping information to be deployed within the country in which the wireless communication device is being operated.

6. The method of claim 1, wherein in an instance in which the location of the wireless communication device is not available to the wireless communication device, the method comprises the wireless communication device:
   scanning for at least one of the plurality of RATs supported by the wireless communication device in accordance with a predefined RAT priority ordering, the predefined RAT priority ordering prioritizing the plurality of RATs supported by the wireless communication device based on a number of bands used by each of the plurality of RATs from a highest priority RAT using the fewest bands to a lowest priority RAT using the most bands;
   discovering a network via scanning in accordance with the predefined RAT priority ordering;
   determining the location of the wireless communication device based at least in part on information provided by the discovered network; and discontinuing scanning in accordance with the predefined RAT priority ordering prior to performing the service scan.

7. The method of claim 6, wherein the predefined RAT priority ordering prioritizes one or more second generation (2G) RATs in a highest priority grouping, one or more third generation (3G) RATs in a second priority grouping, and one or more fourth generation (4G) RATs in a third priority grouping.

8. A wireless communication device comprising:
at least one transceiver, the at least one transceiver configured to transmit and receive data in accordance with a plurality of radio access technologies (RATs) supported by the wireless communication device; and
processing circuitry coupled to the at least one transceiver, the processing circuitry configured to control the wireless communication device to at least:
determine a location of the wireless communication device;
select a subset of the plurality of RATs supported by the wireless communication device, and for each selected RAT at least one deployed band, based at least in part on the location of the wireless communication device and on deployment mapping information, the selected subset comprised only of one or more RATs indicated by the deployment mapping information as deployed in the location of the wireless communication device; and
perform a service scan for at least one RAT included in the selected subset only on deployed bands, wherein any RAT of the plurality of RATs supported by the wireless communication device that is not included in the selected subset is excluded from the service scan.

9. The wireless communication device of claim 8, wherein the processing circuitry is further configured to control the wireless communication device to:
select deployed bands for a respective RAT based at least in part on the deployment mapping information and excluding any band used by the RAT that is indicated by the deployment mapping information as not deployed in the location of the wireless communication device.

10. The wireless communication device of claim 8, wherein the deployment mapping information is pre-provisioned to the wireless communication device.

11. The wireless communication device of claim 8, wherein the deployment mapping information defines a mapping between each location of a plurality of locations and a respective set of one or more RATs deployed in the location.

12. The wireless communication device of claim 8, wherein the processing circuitry is further configured to control the wireless communication device to:
determine the location of the wireless communication device at least in part by determining a country in which the wireless communication device is being operated, the deployment mapping information defining a mapping between each country of a plurality of countries and a respective set of one or more RATs deployed in the country; and
select the subset at least in part by selecting a subset of the plurality of RATs supported by the wireless communication device comprised of one or more RATs indicated by the deployment mapping information to be deployed within the country in which the wireless communication device is being operated.

13. The wireless communication device of claim 8, wherein in an instance in which the location of the wireless communication device is not available to the wireless communication device, the processing circuitry is further configured to control the wireless communication device to:
scan for at least one of the plurality of RATs supported by the wireless communication device in accordance with a predefined RAT priority ordering, the predefined RAT priority ordering prioritizing the plurality of RATs supported by the wireless communication device based on a number of bands used by each of the plurality of RATs from a highest priority RAT using the fewest bands to a lowest priority RAT using the most bands;
discover a network via scanning in accordance with the predefined RAT priority ordering;
determine the location of the wireless communication device based at least in part on information provided by the discovered network; and
discontinue scanning in accordance with the predefined RAT priority ordering prior to performing the service scan.

14. The wireless communication device of claim 13, wherein the predefined RAT priority ordering prioritizes one or more second generation (2G) RATs in a highest priority grouping, one or more third generation (3G) RATs in a second priority grouping, and one or more fourth generation (4G) RATs in a third priority grouping.

15. A computer program product for reducing network service scan time by a wireless communication device, the computer program product comprising at least one non-transitory computer readable storage medium having computer program code stored thereon, the computer program code comprising:
program code for determining a location of the wireless communication device;
program code for selecting a subset of a plurality of radio access technologies (RATs) supported by the wireless communication device, and for each selected RAT at least one deployed band, based at least in part on the location of the wireless communication device and on deployment mapping information, the selected subset comprised only of one or more RATs indicated by the deployment mapping information as deployed in the location of the wireless communication device; and
program code for performing a service scan for at least one RAT included in the selected subset only on deployed bands, wherein any RAT of the plurality of RATs supported by the wireless communication device that is not included in the selected subset is excluded from the service scan.

16. The computer program product of claim 15, further comprising:
program code for selecting deployed bands for a respective RAT based at least in part on the deployment mapping information and excluding any band used by the RAT that is indicated by the deployment mapping information as not deployed in the location of the wireless communication device.

17. The computer program product of claim 15, wherein the deployment mapping information is pre-provisioned to the wireless communication device.

18. The computer program product of claim 15, wherein the deployment mapping information defines a mapping between each location of a plurality of locations and a respective set of one or more RATs deployed in the location.

19. The computer program product of claim 15, wherein:
the program code for determining the location of the wireless communication device comprises program code for determining a country in which the wireless communication device is being operated, the deployment mapping information defining a mapping between each country of a plurality of countries and a respective set of one or more RATs deployed in the country; and
the program code for selecting the subset comprises program code for selecting a subset of the plurality of RATs supported by the wireless communication device comprised of one or more RATs indicated by the deployment mapping information to be deployed within the country in which the wireless communication device is being operated.

20. The computer program product of claim 15, further comprising, program code, for in an instance in which the location of the wireless communication device is not available to the wireless communication device:
scanning for at least one of the plurality of RATs supported by the wireless communication device in accordance with a predefined RAT priority ordering, the predefined RAT priority ordering prioritizing the plurality of RATs supported by the wireless communication device based on a number of bands used by each of the plurality of RATs from a highest priority RAT using the fewest bands to a lowest priority RAT using the most bands;
discovering a network via scanning in accordance with the predefined RAT priority ordering;
determining the location of the wireless communication device based at least in part on information provided by the discovered network; and
discontinuing scanning in accordance with the predefined RAT priority ordering prior to performing the service scan.

21. An apparatus configurable for operation in a wireless communication device, the apparatus comprising:
processing circuitry configured to control the wireless communication device to at least:
determine a location of the wireless communication device;
select a subset of a plurality of radio access technologies (RATs) supported by the wireless communication device, and for each selected RAT at least one deployed band, based at least in part on the location of the wireless communication device and on deployment mapping information, the selected subset comprised only of one or more RATs indicated by the deployment mapping information as deployed in the location of the wireless communication device; and
perform a service scan for at least one RAT included in the selected subset only on deployed bands, wherein any RAT of the plurality of RATs supported by the wireless communication device that is not included in the selected subset is excluded from the service scan.

22. The apparatus of claim 21, wherein the processing circuitry is further configured to control the wireless communication device to:
select deployed bands for a respective RAT based at least in part on the deployment mapping information and excluding any band used by the RAT that is indicated by the deployment mapping information as not deployed in the location of the wireless communication device.

23. The apparatus of claim 21, wherein the deployment mapping information is pre-provisioned to the wireless communication device.

24. The apparatus of claim 21, wherein the deployment mapping information defines a mapping between each location of a plurality of locations and a respective set of one or more RATs deployed in the location.

25. The apparatus of claim 21, wherein the processing circuitry is further configured to control the wireless communication device to:
determine the location of the wireless communication device at least in part by determining a country in which the wireless communication device is being operated, the deployment mapping information defining a mapping between each country of a plurality of countries and a respective set of one or more RATs deployed in the country; and
select the subset at least in part by selecting a subset of the plurality of RATs supported by the wireless communication device comprised of one or more RATs indicated by the deployment mapping information to be deployed within the country in which the wireless communication device is being operated.

26. The apparatus of claim 21, wherein in an instance in which the location of the wireless communication device is not available to the wireless communication device, the processing circuitry is further configured to control the wireless communication device to:
scan for at least one of the plurality of RATs supported by the wireless communication device in accordance with a predefined RAT priority ordering, the predefined RAT priority ordering prioritizing the plurality of RATs supported by the wireless communication device based on a number of bands used by each of the plurality of RATs from a highest priority RAT using the fewest bands to a lowest priority RAT using the most bands;
discover a network via scanning in accordance with the predefined RAT priority ordering;
determine the location of the wireless communication device based at least in part on information provided by the discovered network; and
discontinue scanning in accordance with the predefined RAT priority ordering prior to performing the service scan.

27. The apparatus of claim 26, wherein the predefined RAT priority ordering prioritizes one or more second generation (2G) RATs in a highest priority grouping, one or more third generation (3G) RATs in a second priority grouping, and one or more fourth generation (4G) RATs in a third priority grouping.

* * * * *